(12) United States Patent
Su et al.

(10) Patent No.: US 11,506,827 B1
(45) Date of Patent: Nov. 22, 2022

(54) BACKLIGHT MODULE FOR PROTECTING PRIVACY

(71) Applicant: HannStar Display Corporation, Taipei (TW)

(72) Inventors: Chen-Hao Su, Taichung (TW); Chia-Feng Teng, Tainan (TW); Chin-Yung Liu, Tainan (TW)

(73) Assignee: HannStar Display Corporation, Taipei (TW)

( * ) Notice: Subject to any disclaimer, the term of this patent is extended or adjusted under 35 U.S.C. 154(b) by 0 days.

(21) Appl. No.: 17/804,089

(22) Filed: May 25, 2022

(30) Foreign Application Priority Data

Jul. 2, 2021 (CN) .......................... 202110749418.2

(51) Int. Cl.
*F21V 8/00* (2006.01)

(52) U.S. Cl.
CPC ......... *G02B 6/0015* (2013.01); *G02B 6/0043* (2013.01); *G02B 6/0088* (2013.01)

(58) Field of Classification Search
CPC ... G02B 6/0015; G02B 6/0043; G02B 6/0088
See application file for complete search history.

(56) References Cited

U.S. PATENT DOCUMENTS

2011/0304796 A1* 12/2011 Lee ...................... G02B 6/0073
362/97.3

* cited by examiner

*Primary Examiner* — Fatima N Farokhrooz
(74) *Attorney, Agent, or Firm* — CKC & Partners Co., LLC

(57) ABSTRACT

The backlight module includes the following units. Multiple first light emitting units are disposed on a top surface of a transparent substrate. A beam angle of the first light emitting units is greater than or equal to 30 degrees and less than or equal to 45 degrees. Multiple second light emitting units and a light guide plate are disposed on a bottom surface of the transparent substrate. Each second light emitting unit is disposed in a respective hole of the light guide plate. A light intensity of the first light emitting units in a first mode is smaller than that in a second mode. A light intensity of the second light emitting units in the first mode is greater than that in the second mode. In this way, the purpose of privacy protection can be achieved.

10 Claims, 6 Drawing Sheets

BACKLIGHT MODULE FOR PROTECTING PRIVACY

CROSS-REFERENCE TO RELATED APPLICATIONS

This application claims priority to China Application Serial Number 202110749418.2 filed Jul. 2, 2021, which is herein incorporated by reference.

BACKGROUND

Field of Invention

The present disclosure relates to a backlight module for protecting privacy. More particularly, the present disclosure relates to the backlight module having two kinds of light emitting units.

Description of Related Art

One application of a display panel is to meet the need of privacy protection. A contrast ratio of the display panel is reduced when viewing from the left and right viewing angle to produce a relatively narrow viewing angle. In the prior art, microstructures are designed on a light guide plate cooperating with a prism having inverted triangle microstructures for privacy protection.

SUMMARY

Embodiments of the present disclosure provide a backlight module including a transparent substrate, multiple first light emitting units, multiple second light emitting units, and a light guide plate. The transparent substrate has a top surface and a bottom surface opposite to the top surface. The first light emitting units are disposed on the top surface of the transparent substrate. A beam angle of the first light emitting units is greater than or equal to 30 degrees and less than or equal to 45 degrees. The second light emitting units are disposed on the bottom surface of the transparent substrate. The light guide plate is disposed on the bottom surface of the transparent substrate. The light guide plate includes multiple holes corresponding to the second light emitting units respectively, and each of the second light emitting units is disposed in the respective hole. In a first mode, a light intensity of the first light emitting units is equal to a first intensity, and a light intensity of the second light emitting units is equal to a second intensity. In a second mode, the light intensity of the first light emitting units is equal to a third intensity, and the light intensity of the second light emitting units is equal to a fourth intensity. The first intensity is less than the third intensity, and the second intensity is greater than the fourth intensity.

In some embodiments, the first light emitting units have a first maximum light intensity, and the second light emitting units have a second maximum light intensity. The first intensity is less than or equal to 5% of the first maximum light intensity, and the second intensity is equal to 100% of the second maximum light intensity. The third intensity is equal to 100% of the first maximum light intensity, and the fourth intensity is greater than or equal to 10% of the second maximum light intensity and less than or equal to 30% of the second maximum light intensity.

In some embodiments, the first light emitting units correspond to the second light emitting units respectively. A projection of each of the first light emitting units onto the transparent substrate is at least partially overlapped with a projection of the respective second light emitting unit onto the transparent substrate.

In some embodiments, the second light emitting units have a height relative to the bottom surface of the transparent substrate, and a thickness of the light guide plate is greater than or equal to the height.

In some embodiments, multiple dot structures are formed on a top surface or a bottom surface of the light guide plate.

In some embodiments, a diffuser is disposed above the top surface of the transparent substrate. The first light emitting units are disposed between the diffuser and the transparent substrate.

In some embodiments, the backlight module further includes a shielding layer for covering a portion of a top surface of the first light emitting units and side surfaces of the first light emitting units such that the first light emitting units are configured to emit light from the top surface instead of the side surfaces.

In some embodiments, the second light emitting units are configured to emit light from a bottom surface and side surfaces of the second light emitting units.

In some embodiments, the backlight module further includes a back plate having an inner surface facing the light guide plate. A reflective material is formed on the inner surface of the back plate.

In some embodiments, a microstructure is formed on the reflective material. A projection of the microstructure onto the transparent substrate is at least partially overlapped with a projection of the respective second light emitting unit onto the transparent substrate.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
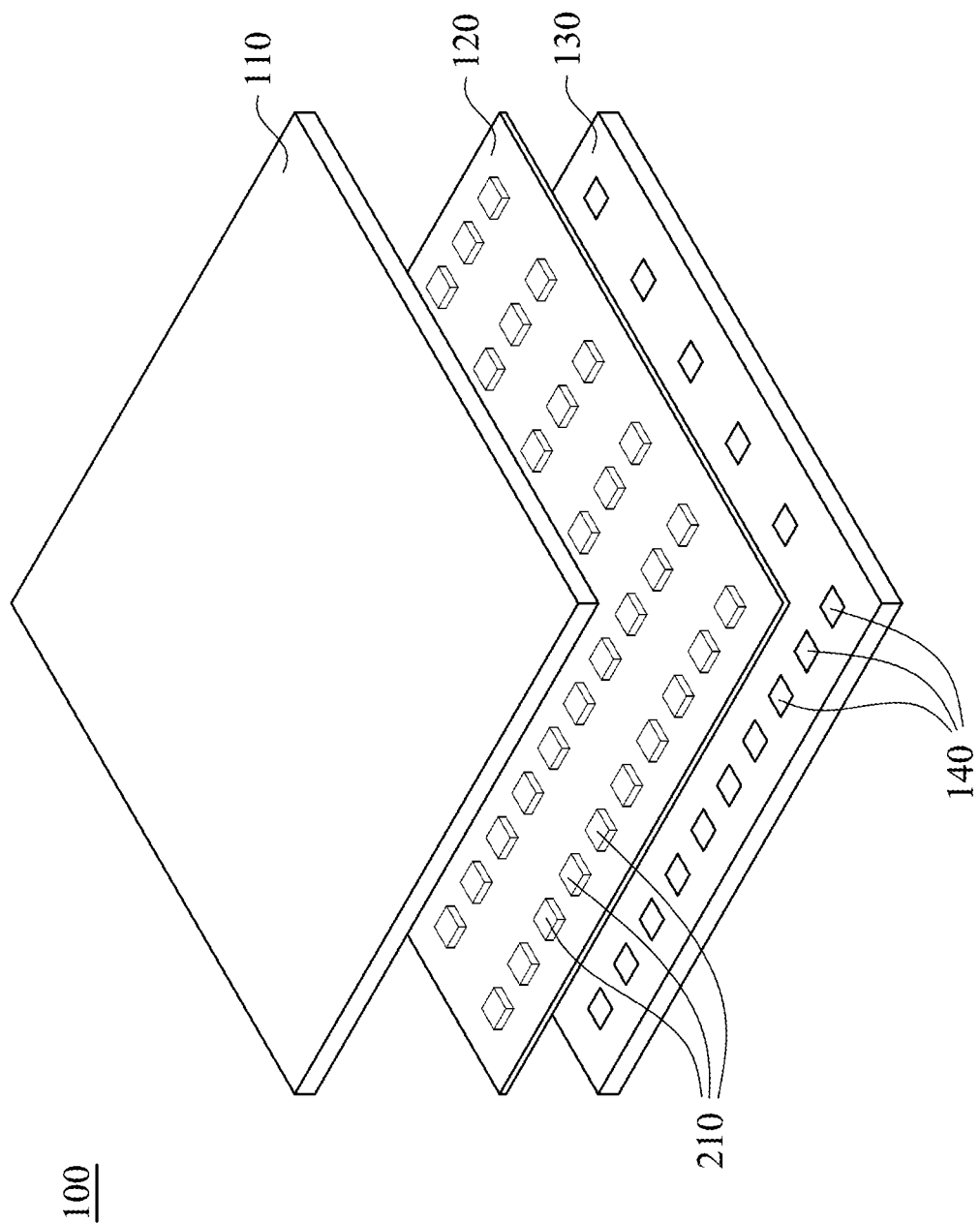
FIG. 1 is a schematic diagram of a backlight module for privacy protection in accordance with an embodiment.

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over, beneath or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The use of "first", "second", "third", etc. in the specification should be understood for identifying units or data described by the same terminology but are not referred to a particular order or sequence.

FIG. 1 is a schematic diagram of a backlight module for privacy protection in accordance with an embodiment. Referring to FIG. 1, a backlight module 100 includes an optical film 110, a transparent substrate 120, and a light guide plate 130. The transparent substrate 120 is disposed between the optical film 110 and the light guide plate 130. The optical film 110 may be a diffuser, a polarizer, or any other suitable optical film. The transparent substrate 120 may include, for example, glass, polyethylene terephthalate (PET) or other transparent materials. In some embodiments, a conductive material such as metal or indium tin oxide (ITO) may be formed on the transparent substrate 120.

Figure 2:
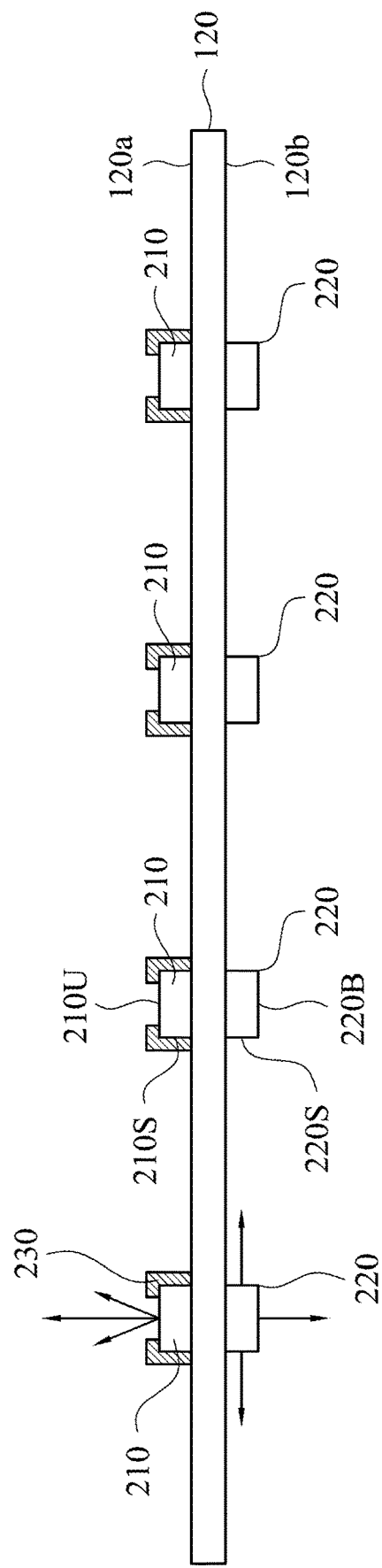
FIG. 2 is a side view of a transparent substrate in accordance with an embodiment.

FIG. 2 is a side view of the transparent substrate in accordance with an embodiment. Referring to FIG. 1 and FIG. 2, the transparent substrate 120 includes a top surface 120a and a bottom surface 120b opposite to each other. The optical film 110 is disposed above the top surface 120a of the transparent substrate 120, and the light guide plate 130 is disposed beneath the bottom surface 120b of the transparent substrate 120. Multiple first light emitting units 210 are disposed on the top surface 120a of the transparent substrate 120, multiple second light emitting units 220 are disposed on the bottom surface 120b, and these light emitting units are, for example, light emitting diodes (LEDs). The sizes of the LEDs may be in the order of millimeter, micrometer or nanometer, which is not limited in the disclosure. The first light emitting units 210 and the second light emitting units 220 are arranged as, for example, a matrix. The first light emitting units 210 correspond to the second light emitting units 220 respectively. A projection of each first light emitting unit 210 onto the transparent substrate 120 is at least partially overlapped with a projection of the respective second light emitting unit 220 onto the transparent substrate 120. In other words, the first light emitting units 210 and the second light emitting units 220 are disposed opposite to each other at the top surface and the bottom surface of the transparent substrate 120 respectively.

Figure 3:
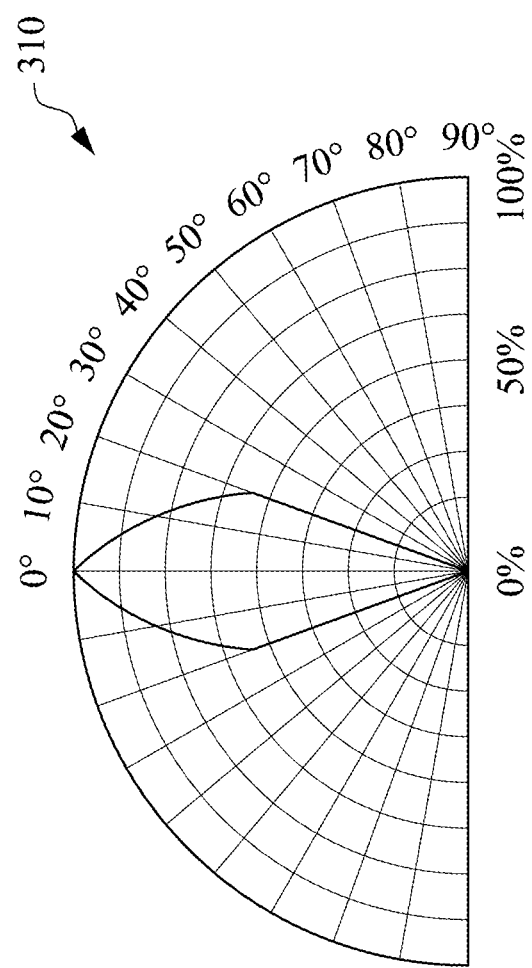
FIG. 3 is a light distribution curve of the first light emitting units in accordance with an embodiment.

In this embodiment, a beam angle of the first light emitting units 210 is greater than or equal to 30 degrees and less than or equal to 45 degrees for providing a light source with a narrow viewing angle. A light distribution curve 310 of the first light emitting units 210 is illustrated in FIG. 3. In some embodiments, the backlight module further includes a shielding layer 230 for covering a portion of a top surface 210U and side surfaces 210S of the first light emitting units 210 such that the first light emitting units 210 emit light from the top surface 210U but not from the side surfaces 210S. A beam angle of the second light emitting units 220 is greater than that of the first light emitting units 210. Each second light emitting unit 220 has a bottom surface 220B and side surfaces 220S. The second light emitting unit 220 emits light from the bottom surface 220B and from the side surfaces 220S. In some embodiments, the shapes of the first light emitting units 210 and the second light emitting units 220 are cubes, and therefore each light emitting unit has four side surfaces. The shielding layer 230 can cover the four side surfaces of the first light emitting unit 210. However, the shape of the light emitting unit is not limited in the disclosure. In some embodiments, the shielding layer 230 may be omitted.

Figure 4:
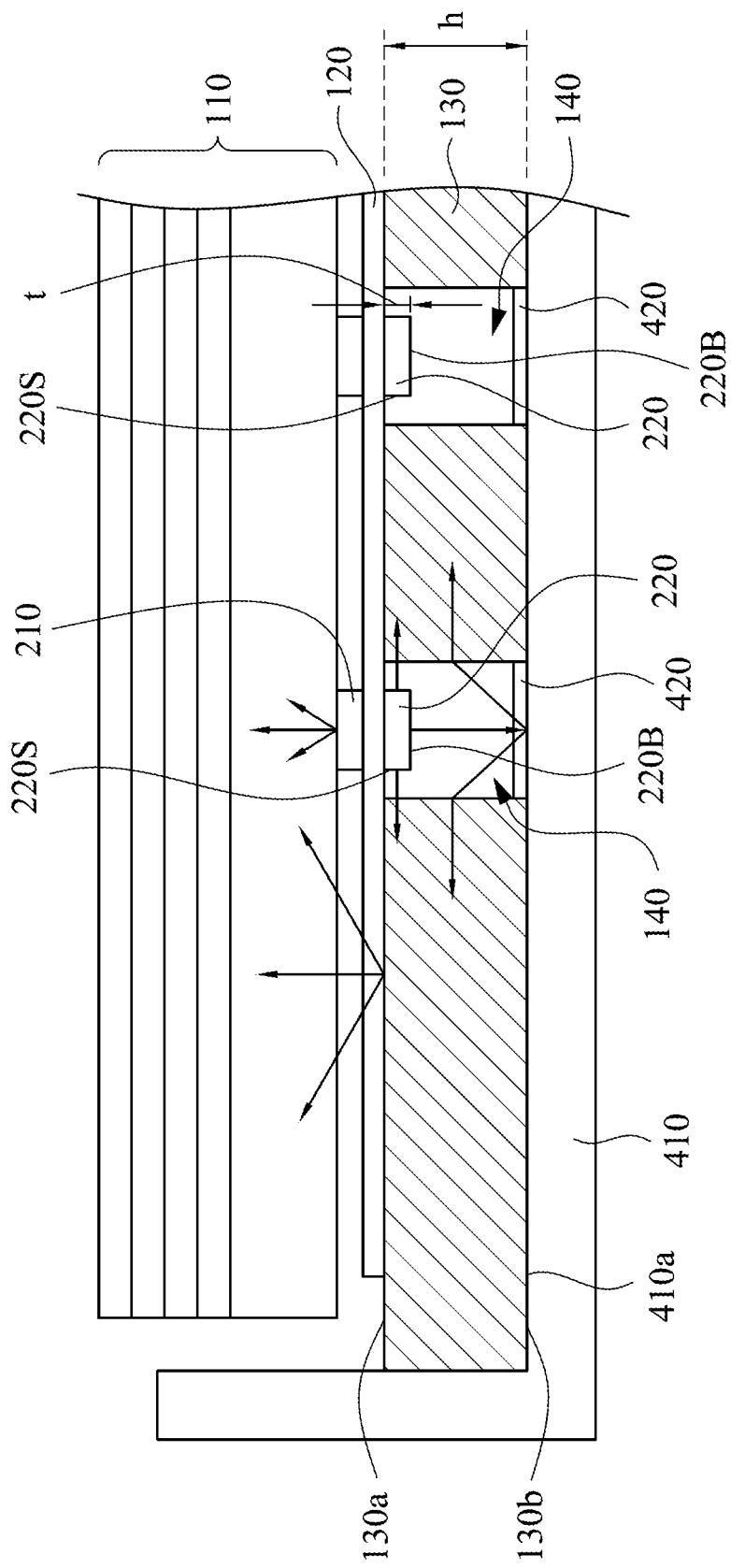
FIG. 4 is a side view of the backlight module in accordance with an embodiment.

Multiple holes 140 are formed in the light guide plate 130 that correspond to the second light emitting units 220 respectively. After the transparent substrate 120 and the light guide plate 130 are assembled, each second light emitting unit 220 is disposed in the respective hole 140. For example, referring to FIG. 4 which is a side view of the backlight module in accordance with an embodiment. The backlight module further includes a back plate 410 having an inner surface 410a. The light guide plate 130 is disposed on the inner surface 410a of the back plate 410. The transparent substrate 120 is disposed above the light guide plate 130. One or multiple optical film 110 is disposed above the transparent substrate 120. In other words, the first light emitting units 210 are disposed between the optical film 110 and the transparent substrate 120. The light emitted from the first light emitting units 210 passes through the optical film 110. The second light emitting units 220 emit light from the bottom surface 220B and the side surfaces 220S. A reflective material 420 is formed on the inner surface 410a of the back plate 410 to reflect the light from the second light emitting units 220 to the light guide plate 130 in which the light is diffused upwards to provide a light source with a wide viewing angle. In some embodiments, microstructures (not shown) may be formed on the reflective material 420 to spread the light uniformly. A projection of the microstructures onto the transparent substrate 120 is at least partially overlapped with a projection of the respective second light emitting unit 220 onto the transparent substrate 120. In some embodiments, the reflective material 420 also corresponds to the second light emitting units 220. Herein, the backlight module 100 can operate in two modes. The first mode is referred to as a normal mode for providing a light source with a wide viewing angle. In this mode, a light intensity of the first light emitting units 210 is relatively smaller (i.e. a first intensity), and a light intensity of the second light emitting units 220 is relatively greater i.e. (a second intensity). The second mode is also referred to as a privacy mode for providing light source with a narrow viewing angle. In the second mode, the light intensity of the first light emitting units 210 is relatively greater (i.e. a third intensity), and the light intensity of the second light emitting units 220 is relatively smaller (i.e. a fourth intensity). Note that the description of "relatively greater" and "relatively smaller" indicates the comparison between the first light emitting unit 210 (second light emitting unit 220) and themselves instead of comparison between the first light emitting unit 210 and the second light emitting unit 220. In other words, the first intensity is less than the third intensity, and the second intensity is greater than the fourth intensity. Whether the first intensity is greater than the second intensity and whether the third intensity is greater than the fourth intensity are not limited in the disclosure.

In some embodiments, the four intensities are represented as a percentage of a maximum light intensity of the corresponding light emitting unit. In detail, the first light emitting units 210 have a first maximum light intensity. The first intensity is less than or equal to 5% of the first maximum light intensity, and the third intensity is equal to 100% of the first maximum light intensity. On the other hand, the second light emitting units 220 have a second maximum light intensity. The second intensity is equal to 100% of the second maximum light intensity, and the fourth intensity is greater than or equal to 10% of the second maximum light intensity and less than or equal to 30% of the second maximum light intensity. From another aspect, in the normal mode, the first light emitting units 210 emit light at 5% of the first maximum light intensity (or may be turned off in some embodiments), and the second light emitting units 220 emit light at the second maximum light intensity. In the privacy mode, the first light emitting units 210 emit light at the first maximum light intensity, and the second light emitting units 220 emit light at 10% to 30% of the second maximum light intensity. Since the light source is mainly provided by the first light emitting units 210 in the privacy mode, the purpose of the narrow viewing angle is achieved while the second light emitting units 220 is used to compensate for some dark zones between the first light emitting units 210.

In some embodiments, the second light emitting unit 220 has a height of t micrometers relative to the bottom surface 220B of the transparent substrate 120. The light guide plate 130 has a thickness of h micrometers. t and h are real numbers, and h is greater than or equal to t.

Figure 5:
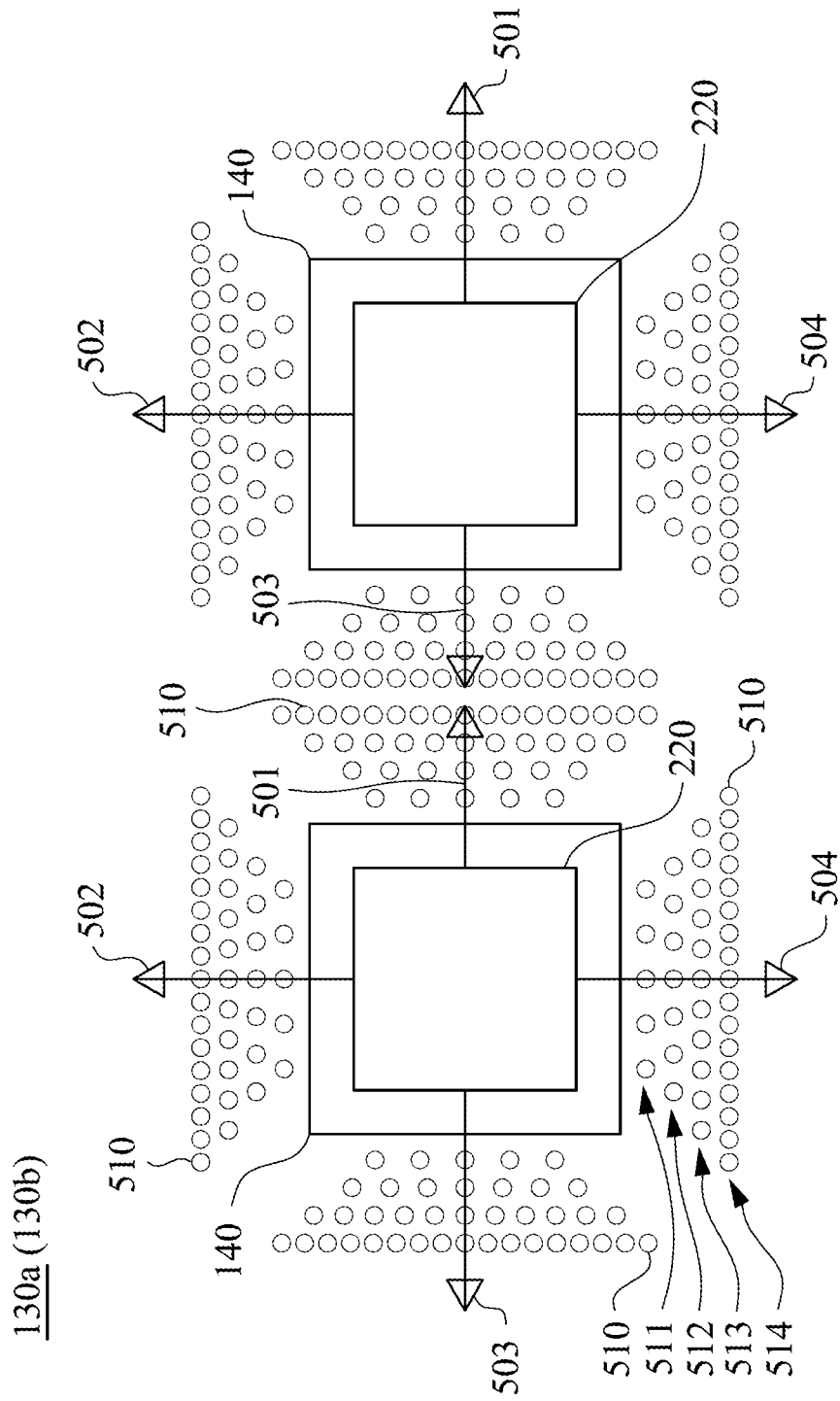
FIG. 5 is a schematic diagram of dot structures on a light guide plate in accordance with an embodiment.

In some embodiments, the light guide plate 130 has a top surface 130a and a bottom surface 130b opposite to the each other. Multiple dot structures are formed on the top surface 130a or the bottom surface 130b near the holes 140. For example, referring to FIG. 5 which is a schematic diagram of the dot structures on the light guide plate in accordance with an embodiment. Multiple dot structures 510 near two holes 140 are illustrated in FIG. 5. There are four directions 501-504 from the centers of the holes 140 on the top surface 130a (or the bottom surface 130b). The dot structures 510 are formed along the four directions 501-504 and arranged as multiple rows. The dot structures 510 are structures protruding from the top surface 130 formed by processes such as injection molding or rolling. The dot structures 510 near the holes 140 are sparsely arranged, and the dot structures 510 far from the holes 140 are densely arranged. For example, in the bottom direction 504 of the left hole 140, the dot structures 510 are arranged as a first row 511, a second row 512, a third row 513, and a fourth row 514. The spaces between the dot structures 510 in the second row 512 are shorter than that in the first row 511 while the length of the second row 512 is longer than that of the first row 511. Similarly, the spaces between the dot structures 510 in the third row 513 are shorter than that in the second row 512 while the length of the third row 513 is longer than that of the second row 512. The spaces between the dot structures 510 in the fourth row 514 are shorter than that in the third row 513 while the length of the fourth row 514 is longer than that of the third row 513. In other words, in a path from one hole 140 to another adjacent hole 140 (e.g. from the left hole 140 to the right hole 140), the dot structures 510 are first arranged with larger spaces, then the spaces are gradually reduced until the middle between the two holes 140 is reached, and then the spaces are gradually increased. These dot structures 510 are used to spread the light out along the directions 501 to 504.

Figure 6:
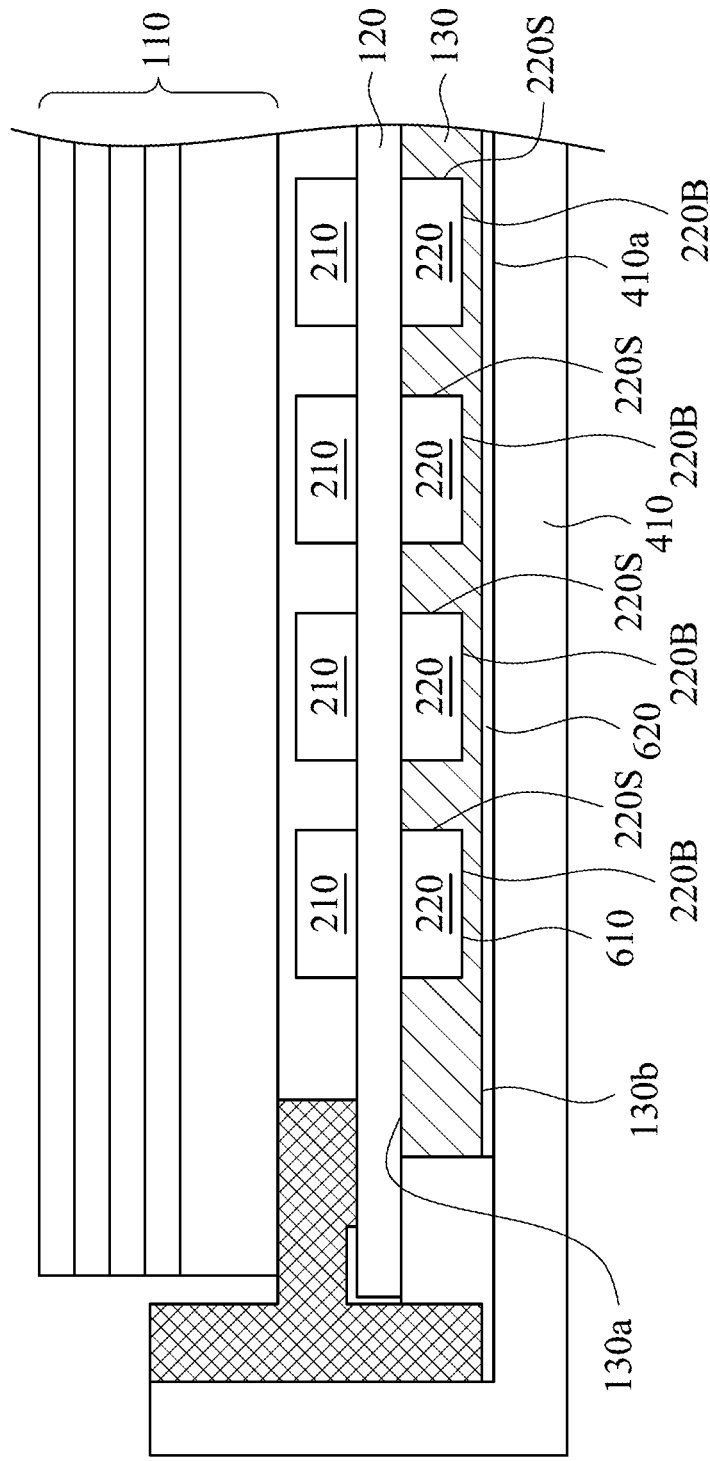
FIG. 6 is a side view of the backlight module in accordance with an embodiment.

FIG. 6 is a side view of the backlight module in accordance with an embodiment. In the embodiment of FIG. 6, a hole 610 on a light guide plate 130 does not penetrate the light guide plate 130, but is recessed from the top surface 130a. The second light emitting unit 220 is disposed in the hole 610. On the other hand, a reflective material 620 is formed on the inner surface 410a of the back plate 410 across multiple second light emitting units 220. That is, a projection of the reflective material 620 onto the transparent substrate 120 encompasses projections of the all the second light emitting units 220 onto the transparent substrate 120. In some embodiments, microstructures (not shown) are formed on a top surface of the reflective material 620.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A backlight module comprising:
    a transparent substrate having a top surface and a bottom surface opposite to the top surface;
    a plurality of first light emitting units disposed on the top surface of the transparent substrate, wherein a beam angle of the first light emitting units is greater than or equal to 30 degrees and less than or equal to 45 degrees;
    a plurality of second light emitting units disposed on the bottom surface of the transparent substrate; and
    a light guide plate disposed beneath the bottom surface of the transparent substrate, wherein the light guide plate comprises a plurality of holes corresponding to the second light emitting units respectively, and each of the second light emitting units is disposed in the respective hole,
    wherein in a first mode, a light intensity of the first light emitting units is equal to a first intensity, and a light intensity of the second light emitting units is equal to a second intensity,
    wherein in a second mode, the light intensity of the first light emitting units is equal to a third intensity, and the light intensity of the second light emitting units is equal to a fourth intensity,
    wherein the first intensity is less than the third intensity, and the second intensity is greater than the fourth intensity.

2. The backlight module of claim 1, wherein the first light emitting units have a first maximum light intensity, the second light emitting units have a second maximum light intensity, the first intensity is less than or equal to 5% of the first maximum light intensity, and the second intensity is equal to 100% of the second maximum light intensity,
    wherein the third intensity is equal to 100% of the first maximum light intensity, and the fourth intensity is greater than or equal to 10% of the second maximum light intensity and less than or equal to 30% of the second maximum light intensity.

3. The backlight module of claim 1, wherein the first light emitting units correspond to the second light emitting units respectively, and a projection of each of the first light emitting units onto the transparent substrate is at least partially overlapped with a projection of the respective second light emitting unit onto the transparent substrate.

4. The backlight module of claim 1, wherein the second light emitting units have a height relative to the bottom surface of the transparent substrate, and a thickness of the light guide plate is greater than or equal to the height.

5. The backlight module of claim 1, wherein a plurality of dot structures are formed on a top surface or a bottom surface of the light guide plate.

6. The backlight module of claim 1, further comprising a diffuser disposed above the top surface of the transparent substrate, wherein the first light emitting units are disposed between the diffuser and the transparent substrate.

7. The backlight module of claim 1, further comprising a shielding layer covering a portion of a top surface of one of the first light emitting units and side surfaces of the one of first light emitting units such that the one of first light emitting units is configured to emit light from the top surface of the one of the first light emitting units but not from the side surfaces of the one of the first light emitting units.

8. The backlight module of claim 1, further comprising:
    a back plate having an inner surface facing the light guide plate, and a reflective material is formed on the inner surface of the back plate.

9. The backlight module of claim 7, wherein each of the second light emitting units is configured to emit light from a bottom surface and side surfaces of the respective second light emitting unit.

10. The backlight module of claim 8, wherein a microstructure is formed on the reflective material, and a projection of the microstructure onto the transparent substrate is at least partially overlapped with a projection of one of the second light emitting units onto the transparent substrate.

\* \* \* \* \*